US007251633B2

(12) United States Patent
Ludtke et al.

(10) Patent No.: US 7,251,633 B2
(45) Date of Patent: Jul. 31, 2007

(54) METHOD OR SYSTEM FOR EXECUTING DEFERRED TRANSACTIONS

(75) Inventors: Harold Aaron Ludtke, San Jose, CA (US); L. Michael Maritzen, Fremont, CA (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 585 days.

(21) Appl. No.: 10/014,960

(22) Filed: Dec. 11, 2001

(65) Prior Publication Data

US 2002/0123970 A1   Sep. 5, 2002

Related U.S. Application Data

(60) Provisional application No. 60/254,604, filed on Dec. 11, 2000.

(51) Int. Cl.
*G06F 17/60* (2006.01)

(52) U.S. Cl. ............... 705/64; 705/41; 705/1; 705/35; 705/39; 705/65; 235/375; 235/379; 235/380

(58) Field of Classification Search .............. 705/64, 705/1, 41, 35, 39, 65; 235/375, 379, 380
See application file for complete search history.

(56) References Cited

U.S. PATENT DOCUMENTS

| 4,582,985 | A |   | 4/1986  | Lofberg         |
|-----------|---|---|---------|-----------------|
| 4,766,293 | A | * | 8/1988  | Boston ........................ 705/41 |
| 5,056,019 | A |   | 10/1991 | Schultz et al.  |
| 5,131,038 | A |   | 7/1992  | Puhl et al.     |
| 5,173,851 | A |   | 12/1992 | Off et al.      |
| 5,221,838 | A |   | 6/1993  | Gutman et al.   |
| 5,256,863 | A |   | 10/1993 | Ferguson et al. |
| 5,276,736 | A |   | 1/1994  | Chaum           |
| 5,280,527 | A |   | 1/1994  | Gullman et al.  |
| 5,323,146 | A |   | 6/1994  | Glaschick et al.|

(Continued)

FOREIGN PATENT DOCUMENTS

EP   0917119 A2   5/1999

(Continued)

OTHER PUBLICATIONS

Middleware Mediated Transactions, Liebig and Tai date unknown.*

(Continued)

*Primary Examiner*—Pierre Elisca
*Assistant Examiner*—John M. Winter
(74) *Attorney, Agent, or Firm*—Lerner, David, Littenberg, Krumholz & Mentlik, LLP (57) ABSTRACT

A method of conducting a transaction between a user of a remote communications device and a second party includes: creating a transaction data structure based on input from the user that defines the transaction; creating a deferred transaction data structure, corresponding to the transaction data structure that defines a deferred transaction, when establishing communication between the remote communications device and the second party is delayed; storing the deferred transaction data structure in a memory; establishing communication between the remote communications device and the second party; and transmitting the deferred transaction data structure to the second party when the communication between the remote communications device and the second party is established.

69 Claims, 5 Drawing Sheets

U.S. PATENT DOCUMENTS

| | | | |
|---|---|---|---|
| 5,329,589 A | 7/1994 | Fraser et al. | |
| 5,436,972 A | 7/1995 | Fischer | |
| 5,457,747 A | 10/1995 | Drexler et al. | |
| 5,461,217 A | 10/1995 | Claus | |
| 5,475,758 A | 12/1995 | Kikuchi et al. | |
| 5,521,362 A | 5/1996 | Powers | |
| 5,521,890 A | 5/1996 | Miche et al. | |
| 5,537,314 A | 7/1996 | Kanter | |
| 5,550,358 A | 8/1996 | Tait et al. | |
| 5,557,518 A | 9/1996 | Rosen | |
| 5,557,541 A | 9/1996 | Schulhof et al. | |
| 5,561,709 A | 10/1996 | Remillard | |
| 5,594,230 A | 1/1997 | Waite et al. | |
| 5,598,474 A | 1/1997 | Johnson | |
| 5,604,805 A | 2/1997 | Brands | |
| 5,615,277 A | 3/1997 | Hoffman | |
| 5,623,552 A | 4/1997 | Lane | |
| 5,650,761 A * | 7/1997 | Gomm et al. | 235/381 |
| 5,661,807 A | 8/1997 | Guski et al. | |
| 5,696,827 A | 12/1997 | Brands | |
| 5,710,887 A | 1/1998 | Chelliah et al. | |
| 5,712,913 A | 1/1998 | Chaum | |
| 5,734,838 A | 3/1998 | Robinson et al. | |
| 5,737,701 A | 4/1998 | Rosenthal et al. | |
| 5,744,787 A | 4/1998 | Teicher | |
| 5,748,737 A | 5/1998 | Daggar | |
| 5,761,308 A | 6/1998 | Torii et al. | |
| 5,778,068 A | 7/1998 | Johnson et al. | |
| 5,778,384 A | 7/1998 | Provino et al. | |
| 5,796,832 A | 8/1998 | Kawan | |
| 5,809,212 A | 9/1998 | Shasha | |
| 5,815,665 A | 9/1998 | Teper et al. | |
| 5,825,876 A | 10/1998 | Peterson, Jr. | |
| 5,838,812 A | 11/1998 | Pare, Jr. et al. | |
| 5,841,871 A | 11/1998 | Pinkas et al. | |
| 5,856,659 A | 1/1999 | Drupsteen et al. | |
| 5,870,723 A | 2/1999 | Pare, Jr. et al. | |
| 5,878,138 A | 3/1999 | Yacobi | |
| 5,878,139 A | 3/1999 | Rosen | |
| 5,878,235 A | 3/1999 | Porterfield et al. | |
| 5,884,271 A | 3/1999 | Pitroda | |
| 5,884,272 A | 3/1999 | Walker et al. | |
| 5,892,900 A | 4/1999 | Ginter et al. | |
| 5,897,622 A | 4/1999 | Blinn et al. | |
| 5,903,721 A | 5/1999 | Sixtus | |
| 5,915,022 A | 6/1999 | Robinson et al. | |
| 5,917,913 A | 6/1999 | Wang | |
| 5,923,016 A | 7/1999 | Fredregill et al. | |
| 5,926,624 A | 7/1999 | Katz et al. | |
| 5,926,798 A | 7/1999 | Carter | |
| 5,936,220 A | 8/1999 | Hoshino et al. | |
| 5,943,423 A | 8/1999 | Muftic | |
| 5,945,652 A | 8/1999 | Ohki et al. | |
| 5,948,040 A | 9/1999 | DeLorme et al. | |
| 5,949,411 A | 9/1999 | Doerr et al. | |
| 5,956,699 A | 9/1999 | Wong et al. | |
| 5,966,704 A | 10/1999 | Furegati et al. | |
| 5,987,134 A | 11/1999 | Shin et al. | |
| 5,990,804 A | 11/1999 | Koyama | |
| 6,000,832 A | 12/1999 | Franklin et al. | |
| 6,002,770 A | 12/1999 | Tomko et al. | |
| 6,002,787 A | 12/1999 | Takhar et al. | |
| 6,003,014 A * | 12/1999 | Lee et al. | 705/13 |
| 6,006,200 A | 12/1999 | Boies et al. | |
| 6,009,415 A | 12/1999 | Shurling et al. | |
| 6,012,039 A | 1/2000 | Hoffman et al. | |
| 6,014,636 A | 1/2000 | Reeder | |
| 6,016,476 A | 1/2000 | Maes et al. | |
| 6,018,724 A | 1/2000 | Arent | |
| 6,021,496 A | 2/2000 | Dutcher et al. | |
| 6,023,679 A | 2/2000 | Acebo et al. | |
| 6,026,491 A | 2/2000 | Hiles | |
| 6,047,268 A | 4/2000 | Bartoli et al. | |
| 6,047,269 A | 4/2000 | Biffar | |
| 6,076,075 A * | 6/2000 | Teicher | 705/41 |
| 6,078,891 A | 6/2000 | Riordan et al. | |
| 6,085,178 A | 7/2000 | Bigus et al. | |
| 6,088,731 A | 7/2000 | Kiraly et al. | |
| 6,105,010 A | 8/2000 | Musgrave | |
| 6,108,644 A | 8/2000 | Goldschlag et al. | |
| 6,119,096 A | 9/2000 | Mann et al. | |
| 6,128,602 A | 10/2000 | Northington et al. | |
| 6,129,274 A | 10/2000 | Suzuki | |
| 6,138,911 A | 10/2000 | Fredregill et al. | |
| 6,141,754 A | 10/2000 | Choy | |
| 6,148,241 A | 11/2000 | Ludtke et al. | |
| 6,151,600 A | 11/2000 | Dedrick | |
| 6,163,772 A | 12/2000 | Kramer et al. | |
| 6,263,446 B1 | 7/2001 | Kausik et al. | |
| 6,270,011 B1 | 8/2001 | Gottfried | |
| 6,279,112 B1 | 8/2001 | O'Toole et al. | |
| 6,282,653 B1 | 8/2001 | Berstis et al. | |
| 6,289,323 B1 | 9/2001 | Gordon et al. | |
| 6,310,966 B1 | 10/2001 | Dulude et al. | |
| 6,314,196 B1 | 11/2001 | Yamaguchi et al. | |
| 6,353,811 B1 | 3/2002 | Weissman | |
| 6,356,905 B1 | 3/2002 | Gershman et al. | |
| 6,366,953 B2 | 4/2002 | Inoue | |
| 6,370,629 B1 | 4/2002 | Hastings et al. | |
| 6,434,535 B1 | 8/2002 | Kupka et al. | |
| 6,453,301 B1 | 9/2002 | Niwa | |
| 6,529,885 B1 | 3/2003 | Johnson | |
| 6,556,976 B1 | 4/2003 | Callen | |
| 6,560,741 B1 | 5/2003 | Gerety et al. | |
| 6,574,607 B1 | 6/2003 | Carter et al. | |
| 6,578,014 B1 | 6/2003 | Murcko, Jr. | |
| 6,592,044 B1 | 7/2003 | Wong et al. | |
| 6,615,264 B1 | 9/2003 | Stoltz et al. | |
| 6,655,585 B2 | 12/2003 | Shinn | |
| 6,662,166 B2 | 12/2003 | Pare, Jr. et al. | |
| 2001/0044906 A1 | 11/2001 | Kanevsky et al. | |
| 2001/0045458 A1 | 11/2001 | Polansky | |
| 2002/0147914 A1 | 10/2002 | Arnold | |

FOREIGN PATENT DOCUMENTS

| | | |
|---|---|---|
| EP | 1 033 687 A2 | 9/2000 |
| EP | EP-1 085 424 A1 | 3/2001 |
| JP | 9722857 | 2/1997 |
| JP | 9978521 | 3/1999 |
| JP | 99164179 | 6/1999 |
| TW | 351799 | 2/1999 |
| TW | 87107650 | 2/1999 |
| WO | WO-95/13591 | 5/1995 |
| WO | WO 99/06928 | 2/1999 |
| WO | WO-01/008055 A1 | 2/2001 |
| WO | WO-01/22351 A1 | 3/2001 |
| WO | WO-01/050428 A1 | 7/2001 |
| WO | WO-01/59732 A2 | 8/2001 |
| WO | WO 2005/033830 * | 4/2005 |

OTHER PUBLICATIONS

Drury; Demand Jumps For High-Tech ID Producer; Business First; Oct. 22, 2001; vol. 18, No. 3, p. 1.

Drury; Demand Jumps For High-Tech ID Producer; Business First; Oct. 22, 2001; vol. 18, No. 3, p. 1.

Co-pending U.S. Appl. No. 09/466,965, Authentication System, Fingerprint Identification Unit, and Authentication Method, filed Dec. 20, 1999.

PACK: "Traditional Retailers Plan Interactive Stores", Orlando Sentinel, May 25, 1995.

U.S. Appl. No. 10/014,960, filed Dec. 11, 2001, entitled "Method Or System For Executing Deferred Transactions".

U.S. Appl. No. 10/015,070, filed Dec. 11, 2001, entitled "Method And System Of Conducting Network-Based Transactions".

U.S. Appl. No. 09/483,584, filed Dec. 11, 2000, entitled "Secure Electronic Commerce System".

U.S. Appl. No. 10/014,112, filed Dec. 11, 2001, entitled "System And Method For Conducting Secure Transactions Over A Network".

McKendrick, Joseph, Creating a Password for Life from the Tip of a Finger, Nov. 3, 1999, ent, v4, n19, p. 22.

U.S. Appl. No. 10/014,112, filed Dec. 11, 2001, entitled "System And Method For Conducting Secure Transactions Over A Network".

U.S. Appl. No. 10/015,070, filed Dec. 11, 2001, entitled "Method And System Of Conducting Network-Based Transactions".

U.S. Appl. No. 09/483,584, filed Dec. 11, 2000, entitled "Secure Electronic Commerce System".

* cited by examiner

METHOD OR SYSTEM FOR EXECUTING DEFERRED TRANSACTIONS

CROSS REFERENCE TO RELATED APPLICATIONS

This application claims the benefit of U.S. Provisional Patent Application No. 60/254,604, filed Dec. 11, 2000, entitled METHOD AND SYSTEM FOR EXECUTING DEFERRED TRANSACTIONS, the entire disclosure of which is hereby incorporated by reference.

BACKGROUND OF THE INVENTION

The present invention relates to an electronic commerce system and method. In particular, the present invention relates to methods of, and systems for, conducting a transaction between a user of a remote communications device and a second party.

Mobil commerce, also known as m-commerce, is gaining greater market penetration as the use of electronic networks (such as the Internet) become more popular. Mobile commerce involves the execution of a transaction between a user of a remote communications device (e.g., a mobile communications device) and a second party, such as a merchant, a bank, a back-end settlement system (e.g., a transaction processing system of a financial institution), etc.

The general process steps associated with conducting a transaction between two parties using mobile commerce includes activating a mobile device and executing a software application suitable for conducting a transaction. A real time secure communications session is established between the mobile device and the other party over a communications channel to facilitate the transaction.

Parameters of a real time transaction are established, such as monetary amounts, account information, product and/or service identification, delivery information, etc. Often, these parameters are established via user input to the software application. For example, the software application may facilitate the transmission of an electronic form from the other party to the mobile device over the communications channel. The electronic form may include entry fields, which correspond to the parameters of the transaction, e.g., product identification, price, delivery, etc. As the user enters information into the form, the information establishes at least some of the parameters of the transaction.

A real time transaction data structure is created by the software application, which includes the parameters of the transaction previously obtained. The real time transaction data structure may be augmented with a digital certificate suitable for authenticating the data structure as is known in the art. The real time transaction data structure and digital certificate, if any, is transferred to the other party over the communications channel. A response is received at the mobile device from the other party and additional steps necessary to complete the transaction are performed.

The above described conventional process for conducting a mobile transaction suffers from a substantial disadvantage in that no progress can be made in facilitating the transaction when the secure communications session over the communications channel is not established. Indeed, there are often times when the mobile device is not in communication with the other party and such communication cannot be established, for example, due to failures in certain equipment, excessive loads over the communications channel, etc. Thus, the user must wait until a later time to execute the steps necessary to conduct a transaction, despite that the present time is most convenient.

Accordingly, there is a need in the art for new methods of, and systems for, conducting a transaction between a user of a remote communications device and a second party such that at least some of the steps in conducting the transaction may be executed despite a temporary absence of, or capability of establishing, communication between the remote communications device and the second party.

SUMMARY OF THE INVENTION

A method of conducting a transaction between a user of a remote communications device and a second party according to one aspect of the present invention includes: creating a transaction data structure based on input from the user that defines the transaction; creating a deferred transaction data structure, corresponding to the transaction data structure that defines a deferred transaction, when establishing communication between the remote communications device and the second party is temporarily not obtainable or is interrupted; storing the deferred transaction data structure in a memory; establishing communication between the remote communications device and the second party; and transmitting the deferred transaction data structure to the second party when the communication between the remote communications device and the second party is established. Preferably, the deferred transaction data structure is automatically transmitted to the second party when communication is established.

Preferably, the method further includes: creating a real time transaction data structure based on input from the user that defines a real time transaction after the deferred transaction data structure is stored in the memory; creating a combined transaction data structure by aggregating the real time transaction data structure and the deferred transaction data structure; and transmitting the combined transaction data structure to the second party.

The method may also include: establishing a digital certificate and associating the digital certificate with the transaction data structure, the digital certificate identifying the transaction, the user, and/or the remote communications device as being authorized; and associating the digital certificate with the deferred transaction data structure when establishing communication between the remote communications device and the second party is delayed.

Preferably, the method includes: assigning a transaction identification field to each transaction data structure prior to transmitting the combined transaction data structure to the second party; and/or receiving combined response data from the second party containing transaction results concerning the real time transaction data structure and the deferred transaction data structure. The method may also include parsing the combined response data and matching the respective transaction results with the real time transaction and the deferred transaction based on the transaction identification fields. Preferably, the transaction result concerning the real time transaction data structure is matched with the real time transaction before the transaction result concerning the deferred transaction data structure is matched with the deferred transaction.

The method may also preferably include assigning an application identification field to each deferred transaction data structure prior to storing the deferred transaction data structure in memory. In this situation, at least one software application is employed in creating the real time transaction data structure and the deferred transaction data structure.

Preferably, the application identification field(s) are removed from each deferred transaction data structure prior to transmitting the combined transaction data structure to the second party.

Preferably, the method includes: matching the transaction result concerning the real time transaction data structure with the at least one software application to facilitate completion of the real time transaction; and/or matching the transaction result concerning the deferred transaction data structure with the at least one software application and executing the at least one software application to facilitate completion of the deferred transaction.

Alternatively, the method need not include the creation of a real time transaction or a real time transaction data structure. In this case, the above steps concerning the deferred transaction and deferred transaction data structure (s) are carried out irrespective of a real time transaction.

Preferably, at least one software application is employed in creating the deferred transaction data structure and establishing the digital certificate. In this case, it is preferred that the method include storing the digital certificate in memory when (i) establishing communication between the remote communications device and the second party is delayed and (ii) the digital certificate is an application specific digital certificate. The method may also include storing a pointer to the digital certificate in memory when (i) establishing communication between the remote communications device and the second party is delayed, and (ii) the digital certificate is a general digital certificate. Still further, the method may also include storing the digital certificate in memory (or storing a pointer to the digital certificate in memory) when (i) establishing communication between the remote communications device and the second party is delayed, and (ii) the digital certificate is specific to the remote communications device.

In accordance with another aspect of the present invention, a storage medium containing a software program capable of causing a remote communications device to execute actions in conducting a transaction between a user of the remote communications device and a second party is contemplated. Preferably, the actions include those recited in the methods hereinabove. According to still another aspect of the present invention, a remote communications device including a microprocessor operating under the control of the software program is contemplated.

Other objects, features, and advantages of the present invention will become apparent to those skilled in the art from the following description of the invention with reference to the accompanying drawings.

BRIEF DESCRIPTION OF THE DRAWINGS

For the purpose of illustrating the invention, there are shown in the drawing forms, which are presently preferred, it being understood, however, that the invention is not limited to the precise arrangements and instrumentalities shown.

DETAILED DESCRIPTION OF THE PREFERRED EMBODIMENTS

Figure 1:
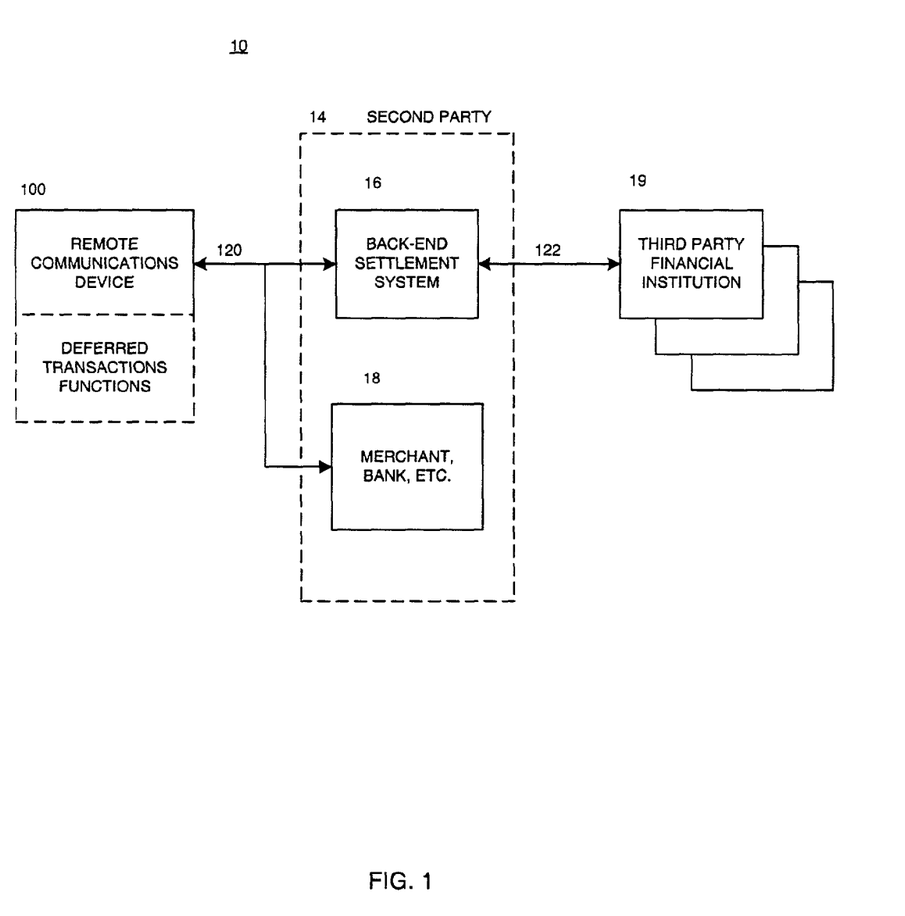
FIG. 1 is a block diagram illustrating an apparatus for conducting a transaction between a user of a remote communications device and a second party in accordance with one or more aspects of the present invention.

Referring now to the drawings wherein like numerals indicate like elements, there is shown in FIG. 1 a block diagram illustrating a system 10 for carrying out a transaction between a user of a remote communications device 100, such as a mobile device, and a second party 14, such as one or more back-end settlement systems 16, a merchant, a bank, a financial institution, another person, another entity at least partially assisting in the transaction (e.g., an autonomous entity, an Internet appliance, etc.) 18. In accordance with an aspect of the invention, the remote communications device 100 includes a deferred transactions function. Communications between the remote communications device 100 and the second party 14 is facilitated over a communications channel 120, such as an electronic network, radio channel, etc. The back-end settlement system 16 may require communication with a third party financial institution 19, such as a payor bank (for the user), etc. This communication may be facilitated over communications channel 122 (which may be the same as channel 120).

Figure 2:
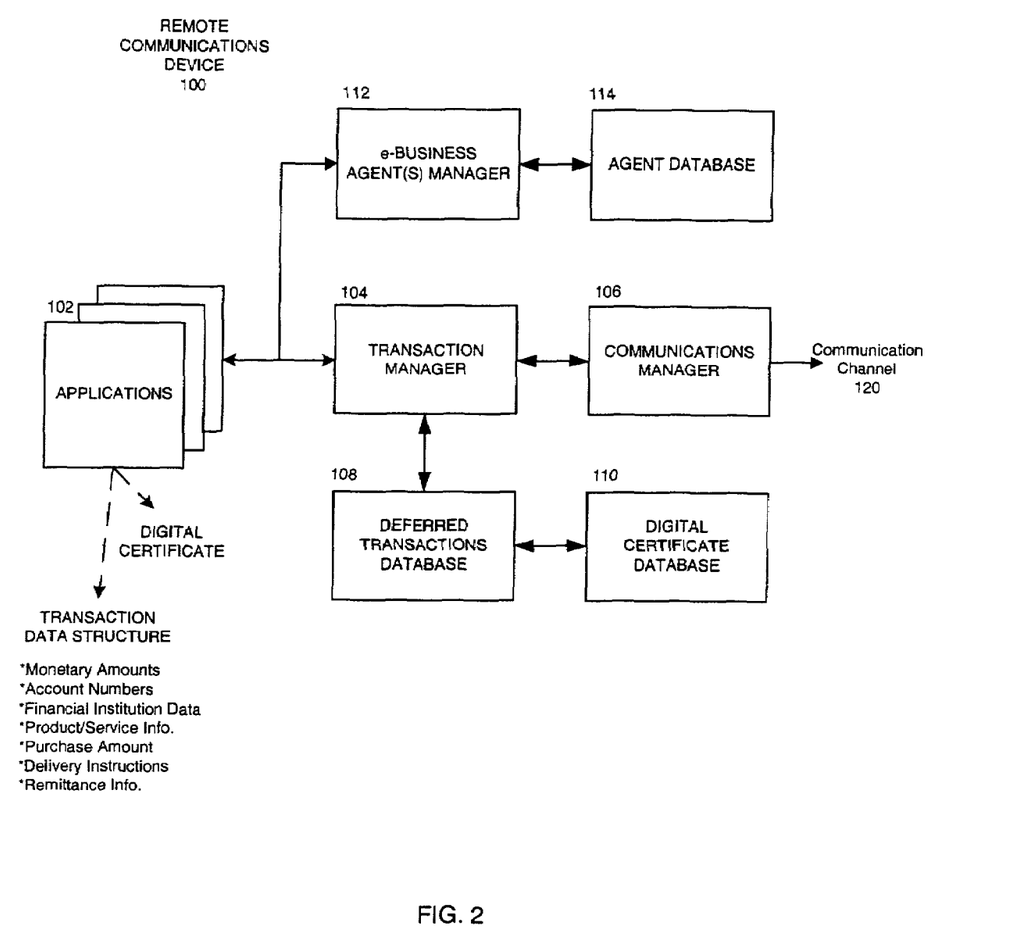
FIG. 2 is a block diagram of a preferred remote communications device operable to conduct a transaction between a user of the remote communications device and a second party in accordance with one or more aspects of the present invention.

Reference is now made to FIG. 2, which is a block diagram of a preferred remote communications device 100 in accordance with one or more aspects of the present invention. Preferably, the remote communications device 100 is in the form of a mobile device, such as a personal digital assistance (PDA) unit (e.g., a palm device/computer such as the Palm Pilot™, Windows CE™ etc.); a cell phone (including an Internet enabled cell phone); a hand held computer (possibly including a wireless modem); a lap top computer; etc. Although mobile devices are preferred, traditionally non-mobile communications devices are also contemplated by the invention, including personal computers, set-top boxes, telephones, etc.

The remote communications device 100 includes at least one application 102, a transaction manager 104, a communications manager 106, a deferred transactions database 108, and a digital certificate database 110. The remote communications device 100 may alternatively further include an e-business agents manager 112, and an agent database 114. For the purposes of discussion, the elements of the remote communications device 100 are illustrated as functional units, which units may be implemented in hardware, software and/or a combination of both. In one embodiment, the remote communications device 100 includes a microprocessor (not shown) operating under the control of a software program, or software programs, capable of causing the device 100 to execute actions in conducting a transaction between a user of the remote communications device 100 and a second party over a communications channel 120. Some of the functional units are preferably substantially all software, such as the application(s) 102, while other functional units may be implemented in substantially all hardware or a combination of software and hardware, such as the transaction manager 104.

An application 102 may be any user application employed to carry out a transaction, such as a web browser program that supports e-commerce transactions and/or m-commerce (e.g., retail/wholesale purchases, Internet banking, settlement transactions, Internet investment transactions, electronic data interchange transactions, etc.). The transaction manager 104 is in communication with the application 102, the deferred transactions database 108, and the communications manager 106 in a way which facilitates the transaction. The transaction is preferably a secure transaction utilizing PKI technology (e.g., including encryption/decryption, establishment of a secure communications session, verification of the second party or server-side entity, authentication of the user of the remote communications device 100, creation of digital signatures, etc.).

The communications manager 106 is preferably operable to establish and manage a communications session with an outside entity (second party) 14, such as a back-end settlement system 16, a merchant, a bank, a financial institution, another person, another entity, etc. 18 (as shown and discussed above with respect to FIG. 1). Preferably, the communications manager 106 is capable of establishing and managing any type of communications, such as cellular transmissions, Blue Tooth RF transmissions, Ethernet transmissions, Internet TCP/IP transmissions, etc.

The types of transactions contemplated by the invention include: (i) electronic network banking (e.g., funds transfers between financial accounts); (ii) settlement activities (e.g., funds clearing between financial accounts, financial institutions, etc.); (iii) retail and/or wholesale purchase and/or delivery of products or services (e.g., e-commerce transactions); (iv) electronic network investment transactions (e.g., retail and/or institutional securities, or bond, transactions); and/or (v) electronic network data interchange (e.g., exchange of information between people or institutions).

The deferred transactions database 108 is preferably operable to receive, and return, deferred transactions data structures from, and to, the transaction manager 104. The deferred transactions database 108 may also communicate with a digital certificate database 110 under certain circumstances (discussed further below).

Figure 3A:
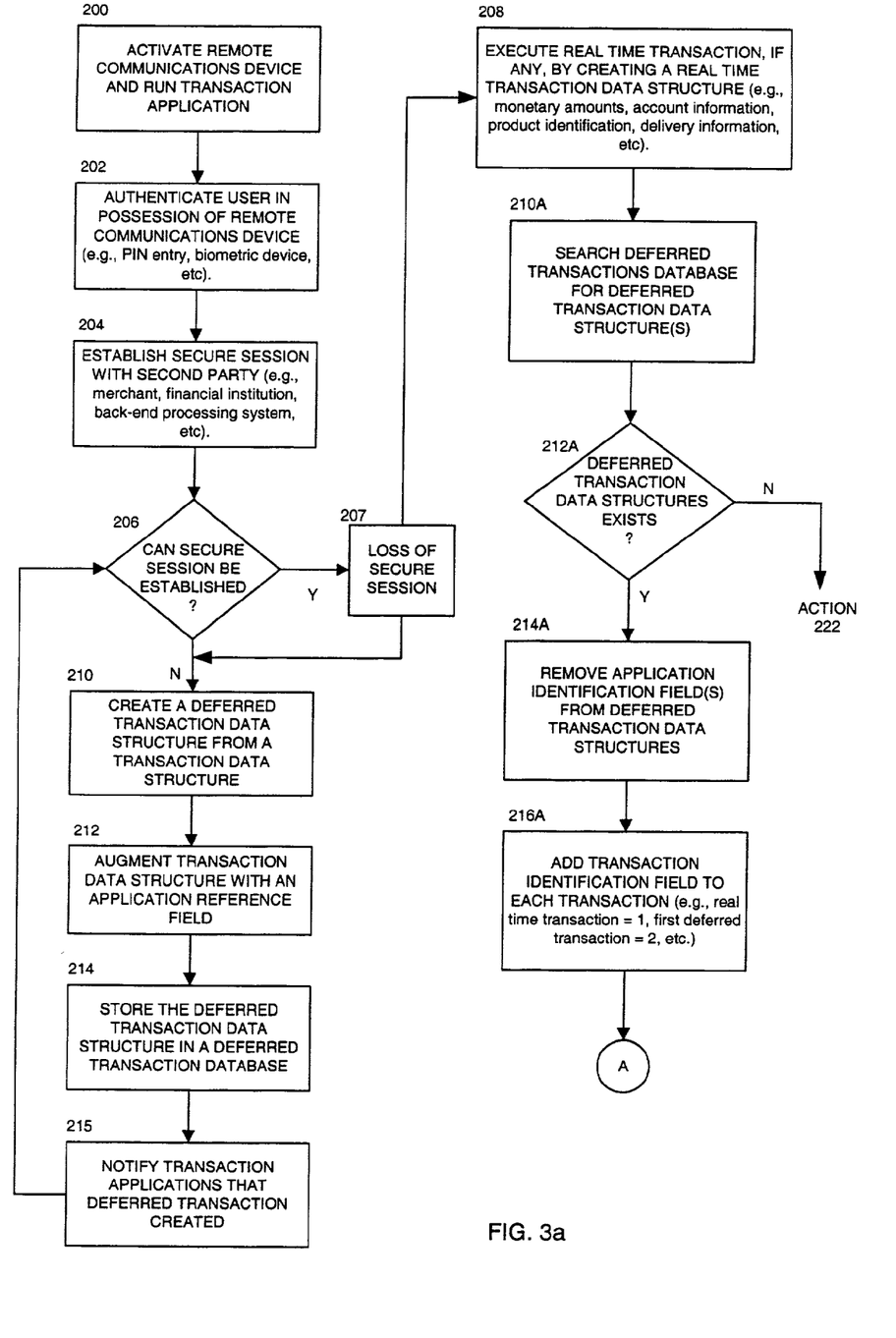
FIGS. 3*a*, 3*b*, and 3*c* are flow diagrams illustrating process steps that may be carried out in accordance with one or more aspects of the present invention.
Figure 3B:
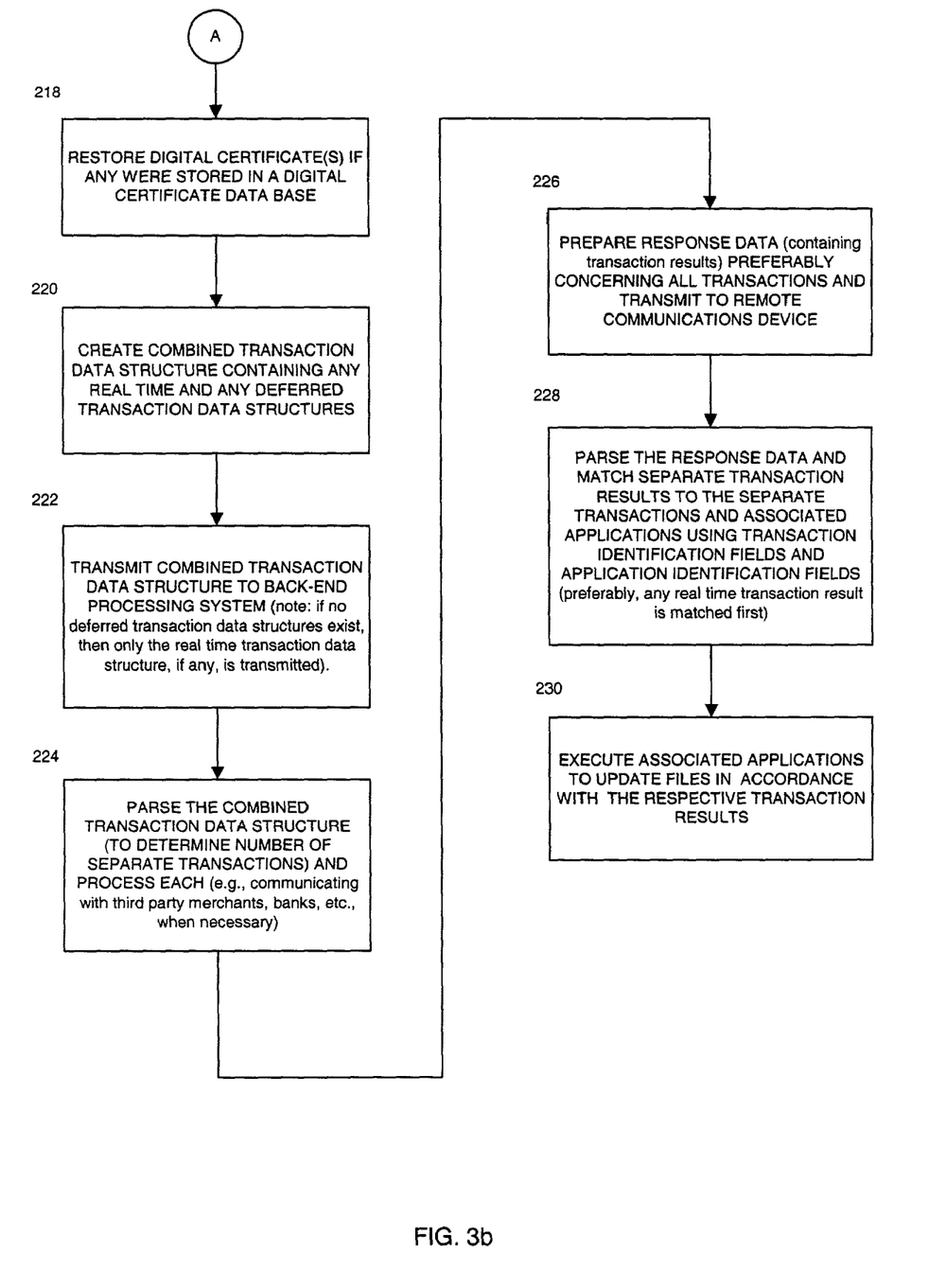

With further reference to FIGS. 3a and 3b, the process steps for carrying out the invention will now be described in conjunction with reference to the system 10 of FIG. 1 and to the remote communications device 100 of FIG. 2. At action 200, the user of the remote communications device 100 activates the device and runs one or more transaction applications 102. At action 202, the transaction manager 104 (possibly in combination with the application 102) authenticates the user in possession of the remote communications device 100, for example, via personal identification number (PIN) entry, biometric information entry (e.g., fingerprint recognition), etc. Additional details concerning the use of fingerprint recognition and/or biometric information entry in general may be found in copending patent application Ser. No. 09/510,811, entitled METHOD OF USING PERSONAL DEVICE WITH INTERNAL BIOMETRIC IN CONDUCTING TRANSACTIONS OVER A NETWORK, and filed Feb. 23, 2000. This co-pending application is assigned to the assignee of the present application and is hereby incorporated herein in its entirety.

At action 204, an attempt to establish a communications session (preferably a secure communications session) with a second party is made. This may preferably be achieved utilizing the communications manager 106. If a secure communications session can be established, then at action 206 the process flow branches to action 208 (shown passing through action 207, which is discussed further below) where a real time transaction is executed, for example, utilizing the application 102. This involves establishing a transaction data structure, which may include monetary amounts, account numbers, financial institution data, product and/or service information, purchase amount, delivery instructions, remittance information, etc. The transaction data structure may be established by way of user input, information stored within the remote communications device 100, and/or information obtained over the communications channel 120 from the second party 14.

If a secure communications session cannot be established at action 206, or if a secure communications session is interrupted (e.g., action 207 due to failure of the remote communications device 100 or some external cause), then the process flow branches to action 210 where a deferred transaction data structure is created from a transaction data structure. This may be achieved utilizing some or all of the information that would be included in a real time transaction data structure, it being preferred that the deferred transaction data structure contains all of the information of a real time transaction data structure augmented with an application identification field. The application identification field preferably identifies which of a plurality of applications 102 the user was executing at the time of establishing the transaction data structure and the deferred transaction data structure.

At action 214, the deferred transaction data structure is stored in a memory, preferably the deferred transactions database 108 (FIG. 2), by way of transaction manager 104. The process flow then preferably advances to action 215. It is noted that the deferred transaction data structure is preferably stored in a secure, interim memory location in the remote communications device 100 such that any attempts at tampering with the deferred transaction data structure is prevented. Advantageously, in the event that a secured communications session is temporarily not obtainable or is interrupted, the deferred transaction data structure is safe in the interim memory (e.g., the deferred transactions database 108) until it is needed. As an added level of security, the deferred transaction data structure is preferably encrypted using known PKI technology prior to storing it in the interim memory. The transaction manager 104 may contain the necessary functionality to accomplish the encryption.

It is noted that a digital certificate may be created at the time that a transaction data structure is created, which digital certificate is capable of authenticating the user, the transaction data structure, and/or the remote communications device 100 itself, thereby ensuring that the transaction is authorized. When a digital certificate is created, it is preferred that the digital certificate be stored with the deferred transaction data structure, for example, in the deferred transactions database 108. When the digital certificate is an application specific digital certificate (i.e., a digital certificate which is utilized by only one application 102, or only certain applications 102), then the digital certificate is preferably stored in the deferred transactions database 108. When the digital certificate is a general digital certificate (i.e., a digital certificate utilized by substantially all of the applications 102), then the digital certificate is preferably stored in a digital certificate database 110 (FIG. 2) such that it may be accessed by any or all of the applications 102. When the digital certificate is specific to the remote communications device 100 (i.e., a digital certificate that authenticates the remote communications device 100 itself), then the digital certificate is preferably stored in the digital certificate database 110. It is noted that the digital certificate could also be a device independent (i.e., transportable) digital certificate. When a digital certificate is stored in the digital certificate database 110, a pointer is preferably stored with the deferred transaction data structure that points to the digital certificate stored in the digital certificate database 110.

At action 215, each of the transaction applications 102 are preferably notified that a corresponding deferred transaction has been (or is being) created. A reference to the deferred transaction data structure of the corresponding deferred transaction is also preferably provided to the transaction application 102, such as a unique identification number, etc. Advantageously, this notification and access to the deferred transaction data structure provides the transaction application with an opportunity to execute appropriate actions in response to the unexpected deferred transaction, such as clean-up etc.

Advantageously, the user is capable of making progress concerning a transaction (i.e., creating a deferred transaction data structure) despite that a secure communications session could not be established with the second party at actions 204, 206, or a secure communications session was lost (action 207). Thus, the user need not expend the effort necessary in creating a real time transaction data structure in the future to facilitate a transaction, which may be defined by the deferred transaction data structure in the present. Indeed, the deferred transaction data structure will be accessible (either automatically or via user command) at a future time when a secure communications session can be established.

Turning again to actions 204, 206, at some time in the future, communications (preferably secure communications) is established between the remote communications device 100 and the second party, for example, a merchant. At action 208, the user preferably executes a real time transaction by creating a transaction data structure defining the real time transaction. It is noted that a real time transaction need not be executed to fall within the scope of the invention. Indeed, the user may wish only to execute one or more of the deferred transactions. Either automatically, or at the user's command, the deferred transactions database 108 is searched for deferred transaction data structure(s) (action 210A). At action 212A, if no deferred transaction data structure(s) exist, then the process flow branches to action 222 (FIG. 3b). If such deferred transaction data structure(s) exist, then the process flow branches to action 214A where the application identification field is preferably removed from each deferred transaction data structure.

At action 216A, a transaction identification field is preferably added to each transaction, for example, the real time transaction, if any, may be assigned an identification field of one (1), a first deferred transaction may be assigned an identification field of two (2), etc. At action 218, (FIG. 3b) any digital certificates that were stored in the digital certificate database 110 are restored. Alternatively, if the digital certificates were stored in the deferred transactions database 108, then they are preferably restored when the deferred transaction data structures are read out of the deferred transactions database 108, for example, at actions 210, 212.

At action 220, a combined transaction data structure is preferably created containing the real time, if any, and one or more deferred transaction data structures. As was discussed above, it is preferred that the deferred transaction data structure is stored in encrypted form. It is also preferred that the combined transaction data structure include the deferred transaction data structures in such encrypted form. At action 222, the combined transaction data structure is transmitted using the communications manager 106 over the communications channel 120 to the second party. It is noted that the combined transaction data structure would contain only the real time transaction data structure, if any, if no deferred transaction data structure(s) exist. Likewise, if no real time transaction data structure exists, then the combined transaction data structure would contain only one or more deferred transaction data structures.

At action 224, the second party preferably parses the combined transaction data structure to determine the number of separate transactions contained therein. If the combined transaction data structure contained encrypted transaction data structures, then the second party would first decrypt the transaction data structures. Each transaction data structure is then processed in a manner well known in the art, for example, by communicating with at least one third party, e.g., merchants, banks, etc. If such communication requires the transmission of the transaction data structure(s), then encryption/decryption is preferably employed to maintain security. The second party preferably prepares response data containing transaction results for each of the transactions of the combined transaction data structure (action 226). The response data is then transmitted to the remote communications device 100 over the communications channel 120. Preferably, the transaction results are encrypted (individually or collectively) prior to transmission over the communications channel 120.

At action 228, the remote communications device 100 preferably parses the response data and matches any separate transaction results to the separate transactions and associated applications 102. This is preferably accomplished using the transaction identification fields and application identification fields. If the transaction results were encrypted prior to transmission, then the transaction manager 104 preferably decrypts them prior to parsing the response data. Preferably, the real time transaction result, if any, is matched with the real time transaction first. At action 230, the associated applications 102 may be executed such that they may draw upon the information in the respective transaction results and the transaction may be completed. It is noted that underlying software services layers (which are substantially transparent to the user) may draw upon the transaction results as well as the associated applications 102 (which are user-level layers).

Figure 3C:
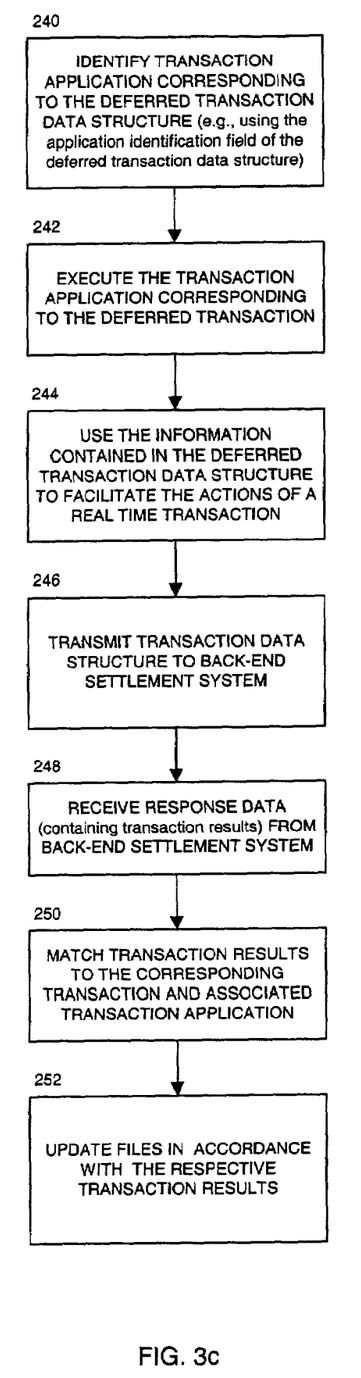

In accordance with an alternative embodiment of the present invention, and with reference to FIGS. 3a and 3b, if a deferred transaction data structure exists (action 212A), then the process flow preferably branches to action 240 (FIG. 3c). There, the transaction application 102 corresponding to the deferred transaction data structure is preferably identified and, at action 242, that transaction application 102 is preferably executed. At action 244, the information contained in the deferred transaction data structure is preferably utilized to facilitate the action of a real time transaction. Thus, the second party 14 (e.g., a back-end settlement system 16) need not have the capabilities of determining whether a transaction is real time or deferred. Instead, the remote communications device 100 is operable to transmit the information contained in the deferred transaction data structure to the back-end settlement system 16 in a way that the back-end settlement system 16 would treat as a real time transaction. For example, this may involve transmitting the entire transaction data structure to the back-end settlement system 16 (action 246).

At action 248, the remote communications device 100 preferably receives response data from the back-end settlement system 16 and, at action 250, matches the transaction results to the corresponding transaction and associated transaction application 102. At action 252, the associated transaction application 102 may draw upon the information in the transaction results and the transaction may be completed.

According to at least one aspect of the invention, the remote communications device 100 preferably includes a microprocessor operating under the control of a software program. The software program is preferably capable of causing the remote communications device 100 to execute the actions disclosed above in, for example, FIGS. 3a, 3b, and/or 3c. In accordance with one or more further aspects of the invention, a storage medium, such as a disk, a CD-ROM, etc. may contain the software program and may be coupled with the remote communication's device 100 in order to facilitate execution of these actions. Accordingly, the features of the invention may be advantageously implemented on existing remote communications devices by distributing the software program contained on the storage medium.

Advantageously, in accordance with the invention, the user can queue transactions (preferably secure transactions) at a convenient time such that they may be carried out transparently, immediately or at a later time. For example, ATM transactions, such as transferring money between accounts, require a significant amount of time to compose and execute at a machine location. Utilizing the invention, however, the user can queue up all of his or her transactions prior to interfacing with an ATM machine such that they may be carried out substantially simultaneously at the ATM machine. Alternatively, the user may employ the remote communications device 100 (e.g., a digital wallet) at a grocery store POS terminal to conduct a real time purchase and simultaneously execute any deferred transactions.

Security loopholes are ameliorated inasmuch as the invention supports security and user authentication at the time of transaction creation and utilizes a secure real time connection to complete the deferred transaction.

The invention also permits maximization of infrastructure efficiency in communication connection and usage while reducing the transaction operation cost on a per transaction basis. Further, if a separate party supplies the infrastructure for the communications connection, that party may be provided with a small service fee when deferred transactions are carried out during a communications session. For example, a grocery store may receive a certain monetary amount for each additional deferred transaction that is not augmented with the grocery store's transaction data structures. This fee would preferably be included in the overall transaction processing fees charged by a back-end settlement system as opposed to being charged to the user.

In accordance with still one or more further aspects of the invention, additional advantages may be obtained when so-called e-business agents are incorporated into the remote communications device 100 (see FIG. 2). An e-business agent manager 112 is preferably incorporated into the system such that it monitors the activities of the applications 102, transaction manager 104, etc. and stores such monitored information in an agent database 114. In particular, outgoing transaction requests from the application 102 to the transaction manager 104 and the incoming responses from the second party 14 through the communications manager 106 are preferably captured. Data mining may be adjusted based on the deferred transactions and/or transaction results.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of conducting a transaction between a user of a remote communications device and a second party, comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory;

establishing communication between the remote communications device and the second party;

transmitting the deferred transaction data structure to the second party when the communication between the remote communications device and the second party is established;

creating a new transaction data structure based on at least one of (i) input from the user that defines a real time transaction data structure after the deferred transaction data structure is stored in the memory, and (ii) the deferred transaction data structure;

creating a combined transaction data structure by aggregating the real time transaction data structure and the deferred transaction data structure if the new transaction data structure is not based on the deferred transaction data structure;

and transmitting at least one of the combined transaction data structure and the new data structure to the second party.

2. The method of claim 1, further comprising assigning a transaction identification field to each transaction data structure prior to transmitting the combined transaction data structure to the second party.

3. The method of claim 1, further comprising receiving combined response data from the second party containing transaction results concerning the real time transaction data structure and the deferred transaction data structure.

4. The method of claim 3, wherein the transmission results are received in encrypted form and are decrypted prior to further processing.

5. The method of claim 3, further comprising parsing the combined response data and matching the respective transaction results with the real time transaction and the deferred transaction based on the transaction identification fields.

6. The method of claim 5, wherein the transaction result concerning the real time transaction data structure is matched with the real time transaction before the transaction result concerning the deferred transaction data structure is matched with the deferred transaction.

7. The method of claim 5, wherein at least one software application is employed in creating the real time transaction data structure and the deferred transaction data structure, the method further comprising assigning an application identification field to each deferred transaction data structure prior to storing the deferred transaction data structure in the memory.

8. The method of claim 7, wherein the at least one software application is a services layer software application.

9. The method of claim 7, wherein the application identification fields are removed from each deferred transaction data structure prior to transmitting the combined transaction data structure to the second party.

10. The method of claim 9, further comprising matching the transaction result concerning the real time transaction data structure with the at least one software application to facilitate completion of the real time transaction.

11. The method of claim 9, further comprising matching the transaction result concerning the deferred transaction data structure with the at least one software application and executing the at least one software application to facilitate completion of the deferred transaction.

12. A method of conducting a transaction between a user of a remote communications device and a second party, comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory;

establishing communication between the remote communications device and the second party;

transmitting the deferred transaction data structure to the second party when the communication between the remote communications device and the second party is established;

creating a combined transaction data structure by aggregating the deferred transaction data structure with any other transaction data structures;

and transmitting the combined transaction data structure to the second party.

13. The method of claim 12, further comprising assigning a transaction identification field to each transaction data structure prior to transmitting the combined transaction data structure to the second party.

14. The method of claim 13, further comprising receiving combined response data from the second party containing transaction results concerning the deferred transaction data structure and the any other transaction data structures.

15. The method of claim 14, further comprising parsing the combined response data and matching the respective transaction results with the deferred transaction and any other transactions associated with the any other transaction data structures.

16. The method of claim 15, wherein at least one software application is employed in creating the deferred transaction data structure, the method further comprising assigning an application identification field to each deferred transaction data structure prior to storing the deferred transaction data structure in the memory.

17. The method of claim 16, wherein the application identification fields are removed from each deferred transaction data structure prior to transmitting the combined transaction data structure to the second party.

18. The method of claim 17, further comprising matching the transaction result concerning the deferred transaction data structure with the at least one software application and executing the at least one software application to facilitate completion of the deferred transaction.

19. A method of conducting a transaction between a user of a remote communications device and a second party, comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory;

establishing communication between the remote communications device and the second party;

transmitting the deferred transaction data structure to the second party when the communication between the remote communications device and the second party is established;

establishing a digital certificate and associating the digital certificate with the transaction data structure, the digital certificate identifying the transaction as being authorized;

and associating the digital certificate with the deferred transaction data structure when establishing communication between the remote communications device and the second party is at least one of temporarily not obtainable and interrupted.

20. The method of claim 19, wherein at least one software application is employed in creating the deferred transaction data structure and establishing the digital certificate, the digital certificate being at least one of (i) an application specific digital certificate used by a particular one of the software applications, (ii) a general digital certificate used by one or more of the software applications, (iii) a remote communications device specific digital certificate associated specifically with the remote communications device, and (iv) a remote communications device independent digital certificate.

21. The method of claim 20, further comprising storing the digital certificate in the memory when (i) establishing communication between the remote communications device and the second party is at least one of temporarily not obtainable and interrupted, and (ii) the digital certificate is an application specific digital certificate.

22. The method of claim 20, further comprising storing a pointer to the digital certificate in the memory when (i) establishing communication between the remote communications device and the second party is at least one of temporarily not obtainable and interrupted, and (ii) the digital certificate is at least one of a general digital certificate and a remote communications device specific digital certificate.

23. The method of claim 19, further comprising transmitting the deferred transaction data structure including the digital certificate to the second party when the communication between the remote communications device and the second party is established.

24. A storage medium containing a software program capable of causing a remote communications device to execute actions in conducting a transaction between a user of the remote communications device and a second party, the actions comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory; establishing communication between the remote communications device and the second party;

transmitting the deferred transaction data structure to the second party when the communication between the remote communications device and the second party is established; creating a new transaction data structure based on at least one of (i) input from the user that defines a real time transaction data structure after the deferred transaction data structure is stored in the memory, and (ii) the deferred transaction data structure; creating a combined transaction data structure by aggregating the real time transaction data structure and the deferred transaction data structure if the new transaction data structure is not based on the deferred transaction data structure;

and transmitting at least one of the combined transaction data structure and the new data structure to the second party.

25. The storage medium of claim 24, wherein the actions further comprise assigning a transaction identification field to each transaction data structure prior to transmitting the combined transaction data structure to the second party.

26. The storage medium of claim 24, wherein the actions further comprise receiving combined response data from the second party containing transaction results concerning the real time transaction data structure and the deferred transaction data structure.

27. The storage medium of claim 26, wherein the transmission results are received in encrypted form and are decrypted prior to further processing.

28. The storage medium of claim 26, wherein the actions further comprise parsing the combined response data and matching the respective transaction results with the real time transaction and the deferred transaction based on the transaction identification fields.

29. The storage medium of claim 28, wherein the transaction result concerning the real time transaction data structure is matched with the real time transaction before the transaction result concerning the deferred transaction data structure is matched with the deferred transaction.

30. The storage medium of claim 28, wherein at least one software application is employed in creating the real time transaction data structure and the deferred transaction data structure, the actions further comprising assigning an application identification field to each deferred transaction data structure prior to storing the deferred transaction data structure in the memory.

31. The storage medium of claim 30, wherein the at least one software application is a services layer software application.

32. The storage medium of claim 30, wherein the application identification fields are removed from each deferred transaction data structure prior to transmitting the combined transaction data structure to the second party.

33. The storage medium of claim 32, wherein the actions further comprise matching the transaction result concerning the real time transaction data structure with the at least one software application to facilitate completion of the real time transaction.

34. The storage medium of claim 33, wherein the actions further comprise matching the transaction result concerning the deferred transaction data structure with the at least one software application and executing the at least one software application to facilitate completion of the deferred transaction.

35. A storage medium containing a software program capable of causing a remote communications device to execute actions in conducting a transaction between a user of the remote communications device and a second party, the actions comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory; establishing communication between the remote communications device and the second party;

transmitting the deferred transaction data structure to the second party when the communication between the remote communications device and the second party is established;

creating a combined transaction data structure by aggregating the deferred transaction data structure with any other transaction data structures;

and transmitting the combined transaction data structure to the second party.

36. The storage medium of claim 35, wherein the actions further comprise assigning a transaction identification field to each transaction data structure prior to transmitting the combined transaction data structure to the second party.

37. The storage medium of claim 36, wherein the actions further comprise receiving combined response data from the second party containing transaction results concerning the deferred transaction data structure and the any other transaction data structures.

38. The storage medium of claim 37, wherein the actions further comprise parsing the combined response data and matching the respective transaction results with the deferred transaction and any other transactions associated with the any other transaction data structures.

39. The storage medium of claim 38, wherein at least one software application is employed in creating the deferred transaction data structure, the method further comprising assigning an application identification field to each deferred transaction data structure prior to storing the deferred transaction data structure in the memory.

40. The storage medium of claim 39, wherein the application identification fields are removed from each deferred transaction data structure prior to transmitting the combined transaction data structure to the second party.

41. The storage medium of claim 40, wherein the actions further comprise matching the transaction result concerning the deferred transaction data structure with the at least one software application and executing the at least one software application to facilitate completion of the deferred transaction.

42. A storage medium containing a software program capable of causing a remote communications device to execute actions in conducting a transaction between a user of the remote communications device and a second party, the actions comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory; establishing communication between the remote communications device and the second party;
transmitting the deferred transaction data structure to the second party when the communication between the remote communications device and the second party is established;
establishing a digital certificate and associating the digital certificate with the transaction data structure, the digital certificate identifying the transaction as being authorized;
and associating the digital certificate with the deferred transaction data structure when establishing communication between the remote communications device and the second party is at least one of temporarily not obtainable and interrupted.

43. The storage medium of claim 42, wherein at least one software application is employed in creating the deferred transaction data structure and establishing the digital certificate, the digital certificate being at least one of (i) an application specific digital certificate used by a particular one of the software applications, (ii) a general digital certificate used by one or more of the software applications, (iii) a remote communications device specific digital certificate associated specifically with the remote communications device, and (iv) a remote communications device independent digital certificate.

44. The storage medium of claim 43, wherein the actions further comprise storing the digital certificate in the memory when (i) establishing communication between the remote communications device and the second party is at least one of temporarily not obtainable and interrupted, and (ii) the digital certificate is an application specific digital certificate.

45. The storage medium of claim 43, wherein the actions further comprise storing a pointer to the digital certificate in the memory when (i) establishing communication between the remote communications device and the second party is at least one of temporarily not obtainable and interrupted, and (ii) the digital certificate is at least one of a general digital certificate and a remote communications device specific digital certificate.

46. The method of claim 42, wherein the actions further comprise transmitting the deferred transaction data structure including the digital certificate to the second party when the communication between the remote communications device and the second party is established.

47. A remote communications device including a microprocessor operating under the control of a software program capable of causing the remote communications device to execute actions in conducting a transaction between a user of the remote communications device and a second party, the actions comprising:
creating a transaction data structure based on input from the user that defines the transaction;
creating a deferred transaction data structure, corresponding to the transaction data structure that defines a deferred transaction, when establishing communication between the remote communications device and the second party is at least one of temporarily not obtainable and interrupted;
storing the deferred transaction data structure in a memory; establishing communication between the remote communications device and the second party;
transmitting the deferred transaction data structure to the second party when the communication between the remote communications device and the second party is established;
creating a new transaction data structure based on at least one of (i) input from the user that defines a real time transaction data structure after the deferred transaction data structure is stored in the memory, and (ii) the deferred transaction data structure;
creating a combined transaction data structure by aggregating the real time transaction data structure and the deferred transaction data structure if the new transaction data structure is not based on the deferred transaction data structure; and
transmitting at least one of the combined transaction data structure and the new data structure to the second party.

48. The remote communications device of claim 47, wherein the actions further comprise assigning a transaction identification field to each transaction data structure prior to transmitting the combined transaction data structure to the second party.

49. The remote communications device of claim 47, wherein the actions further comprise receiving combined response data from the second party containing transaction results concerning the real time transaction data structure and the deferred transaction data structure.

50. The remote communications device of claim 49, wherein the transmission results are received in encrypted form and are decrypted prior to further processing.

51. The remote communications device of claim 49, wherein the actions further comprise parsing the combined response data and matching the respective transaction results with the real time transaction and the deferred transaction based on the transaction identification fields.

52. The remote communications device of claim 51, wherein the transaction result concerning the real time transaction data structure is matched with the real time transaction before the transaction result concerning the deferred transaction data structure is matched with the deferred transaction.

53. The remote communications device of claim 51, wherein at least one software application is employed in creating the real time transaction data structure and the deferred transaction data structure, the actions further comprising assigning an application identification field to each deferred transaction data structure prior to storing the deferred transaction data structure in the memory.

54. The remote communications device of claim 53, wherein the at least one software application is a services layer software application.

55. The remote communications device of claim 53, wherein the application identification fields are removed from each deferred transaction data structure prior to transmitting the combined transaction data structure to the second party.

56. The remote communications device of claim 55, wherein the actions further comprise matching the transaction result concerning the real time transaction data structure with the at least one software application to facilitate completion of the real time transaction.

57. The remote communications device of claim 55, wherein the actions further comprise matching the transaction result concerning the deferred transaction data structure with the at least one software application to facilitate completion of the deferred transaction.

58. A remote communications device including a microprocessor operating under the control of a software program capable of causing the remote communications device to execute actions in conducting a transaction between a user of the remote communications device and a second party, the actions comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory; establishing communication between the remote communications device and the second party;

transmitting the deferred transaction data structure to the second party when the communication between the remote communications device and the second party is established;

creating a combined transaction data structure by aggregating the deferred transaction data structure with any other transaction data structures; and transmitting the combined transaction data structure to the second party.

59. The remote communications device of claim 58, wherein the actions further comprise assigning a transaction identification field to each transaction data structure prior to transmitting the combined transaction data structure to the second party.

60. The remote communications device of claim 59, wherein the actions further comprise receiving combined response data from the second party containing transaction results concerning the deferred transaction data structure and the any other transaction data structures.

61. The remote communications device of claim 60, wherein the actions further comprise parsing the combined response data and matching the respective transaction results with the deferred transaction and any other transactions associated with the any other transaction data structures.

62. The remote communications device of claim 61, wherein at least one software application is employed in creating the deferred transaction data structure, the method further comprising assigning an application identification field to each deferred transaction data structure prior to storing the deferred transaction data structure in the memory.

63. The remote communications device of claim 62, wherein the application identification fields are removed from each deferred transaction data structure prior to transmitting the combined transaction data structure to the second party.

64. The remote communications device of claim 63, wherein the actions further comprise matching the transaction result concerning the deferred transaction data structure with the at least one software application and executing the at least one software application to facilitate completion of the deferred transaction.

65. A remote communications device including a microprocessor operating under the control of a software program capable of causing the remote communications device to execute actions in conducting a transaction between a user of the remote communications device and a second party, the actions comprising:

creating a transaction data structure based on input from the user that defines the transaction;

creating a deferred transaction data structure, corresponding to the transaction data structure that defines a deferred transaction, when establishing communication between the remote communications device and the second party is at least one of temporarily not obtainable and interrupted;

storing the deferred transaction data structure in a memory; establishing communication between the remote communications device and the second party;

transmitting the deferred transaction data structure to the second party when the communication between the remote communications device and the second party is established;

establishing a digital certificate and associating the digital certificate with the transaction data structure, the digital certificate identifying the transaction as being authorized; and associating the digital certificate with the deferred transaction data structure when establishing communication between the remote communications device and the second party is at least one of temporarily not obtainable and interrupted.

66. The remote communications device of claim 65, wherein at least one software application is employed in creating the deferred transaction data structure and establishing the digital certificate, the digital certificate being at least one of (i) an application specific digital certificate used by a particular one of the software applications, (ii) a general digital certificate used by one or more of the software applications, (iii) a remote communications device specific digital certificate associated specifically with the remote communications device, and (iv) a remote communications device independent digital certificate.

67. The remote communications device of claim 66, wherein the actions further comprise storing the digital certificate in the memory when (i) establishing communication between the remote communications device and the second party is at least one of temporarily not obtainable and interrupted, and (ii) the digital certificate is an application specific digital certificate.

68. The remote communications device of claim 66, wherein the actions further comprise storing a pointer to the digital certificate in the memory when (i) establishing communication between the remote communications device and the second party is at least one of temporarily not obtainable and interrupted, and (ii) the digital certificate is at least one of a general digital certificate and a remote communications device specific digital certificate.

69. The method of claim 65, wherein the actions further comprise transmitting the deferred transaction data structure including the digital certificate to the second party when the communication between the remote communications device and the second party is established.

* * * * *